United States Patent [19]

Grisham

[11] Patent Number: 4,739,128

[45] Date of Patent: Apr. 19, 1988

[54] THUMB-CONTROLLED, HAND-HELD JOYSTICK

[75] Inventor: Michael G. Grisham, New York, N.Y.

[73] Assignee: American Telephone and Telegraph Company, AT&T Bell Laboratories, Murray Hill, N.J.

[21] Appl. No.: 928,993

[22] Filed: Nov. 10, 1986

[51] Int. Cl.⁴ .................. H01H 25/04; G09G 3/02
[52] U.S. Cl. ................................. 200/6 A; 340/709
[58] Field of Search ............. 200/5 R, 5 A, 6 R, 6 A, 200/61.54, 61.55, 61.57, 157; 340/709; 273/85 G, 148 B, DIG. 28; 84/DIG. 7

[56] References Cited

U.S. PATENT DOCUMENTS

| | | | |
|---|---|---|---|
| 1,709,068 | 4/1929 | Forseille | 200/61.55 X |
| 2,863,015 | 12/1958 | Ahrens | 200/61.54 |
| 4,308,434 | 12/1981 | Roeser | 200/6 R |
| 4,394,548 | 7/1983 | Dola | 200/6 A |
| 4,408,103 | 10/1983 | Smith, III | 200/6 A |
| 4,415,782 | 11/1983 | Elmberg | 200/6 A |
| 4,425,488 | 1/1984 | Moskin et al. | 200/220 |
| 4,516,939 | 5/1985 | Crimmins, Jr. | 200/6 A X |
| 4,517,424 | 5/1985 | Kroczyhski | 200/5 R X |
| 4,552,360 | 11/1985 | Bromley | 273/DIG. 28 X |
| 4,584,443 | 4/1986 | Yaeger | 200/6 A |
| 4,604,502 | 8/1986 | Thomas | 200/6 A |

FOREIGN PATENT DOCUMENTS 1148303  4/1969  United Kingdom ........... 94/DIG. 7

Primary Examiner—J. R. Scott
Attorney, Agent, or Firm—Henry T. Brendzel

[57] ABSTRACT

A manipulandum contained in a portable housing unit adapted for grasping by hand and situated at one end thereof within an area reachable by the thumb without rearranging the grasp. In one preferred embodiment, the manipulandum is a joystick extending a short distance from the surface of the housing, with its center of neutral position being essentially perpendicular to the center line of the elongated segment in the neighborhood of the joystick. The joystick has a fixed number of positions, with each position being contained within a preselected solid angle. An additional control dimension is realized by moving the joystick along its axis, against a resilient spring, so as to activate or make contact with an electrical switch.

9 Claims, 4 Drawing Sheets

THUMB-CONTROLLED, HAND-HELD JOYSTICK

BACKGROUND OF THE INVENTION

This invention relates to hand-held control devices—also referred to as manipulandi—, and more particularly, to hand-held control devices for developing electrical control signal.

A manipulandum is a device that is manipulated to achieve a particular control result. In the mechanical art, a manipulandum often takes the form of a control lever or wheel, such as the directional signal actuator and the steering wheel on a car, respectively. In the electronic arts, a manipulandum often takes the form of a switch with multiposition switch arrangements. This includes multiswitch combinations such as the telephone touch-tone pad, multiposition toggle switches (often three positions), multiposition rotary switches such as television channel selectors, position-sensitive analog "switches," and combinations of the above. Of the latter variety, some can be more easily classified as switches than others.

The so-called joystick has initially been used as a mechanical manipulandum for airplane controls. More recently, joysticks which combine the mechanical aspects of an airplane joystick with electrical actuators such as switches and/or potentiometers have been used as input devices to electronic games played on a home television screen or at an arcade. In these instances, the joystick is mounted either on a large game unit or on a separate, movable and relatively small unit. The separate unit typically comprises the joystick alone, or perhaps the joystick with some other player-controlled input button, such as a "firing" button.

There are many types of joystick arrangements which address different design problems. Some address the problem of sensing the neutral, center position of the joystick; some address the problem of large size in applications where small size is important; some address the problem of making joysticks that provide direct electrical contact with printed circuit boards; and some deal with the various switch mechanisms that may be employed.

However, most hand-held manipulandum designs in the electronic art do not appear to be very concerned with the convenience of grasping the unit which contains the manipulandum, nor with the convenience of manipulating the control arrangement (e.g., joystick) entirely with one finger and in a manner that follows the natural movements of the finger. Most arrangements are embedded in the electronic equipment, and those that are placed in a separate unit (such as joysticks of electronic games) are designed to be placed on a table top. They can be picked up and held by hand, of course, but their design is such that, for convenient use, one must hold the housing with one hand and manipulate the joystick with the other hand.

It is an object of this invention, therefore, to provide a multiposition manipulandum that permits a convenient grasp of the unit containing the manipulandum and activation of the manipulandum by the simple movement of one of the grasping hand's fingers.

It is another object of this invention to provide a joystick arrangement that is portable, conveniently heldable in one hand, and manipulatable with one finger.

SUMMARY OF THE INVENTION

These and other objects of the invention are achieved with a controller having a manipulandum contained in a portable housing unit which has an elongated segment that is long enough to be grasped by a hand and which has a circumference that is small enough to permit the forefinger and thumb to touch each other. The manipulandum itself is situated at one end of the elongated segment, within an area reachable by the thumb without rearranging the grasp. In one preferred embodiment, the manipulandum is a joystick extending a short distance from the surface of the housing, with its center or neutral position being essentially perpendicular to the center line of the elongated segment in the neighborhood of the joystick. In that embodiment, the joystick is arranged to have a fixed number of positions, with each position being contained within a preselected solid angle. An additional control dimension is realized with a joystick arrangement that is movable along its axis, against a resilient spring, so as to activate or make contact with an electrical switch.

DETAILED DESCRIPTION

Figure 1:
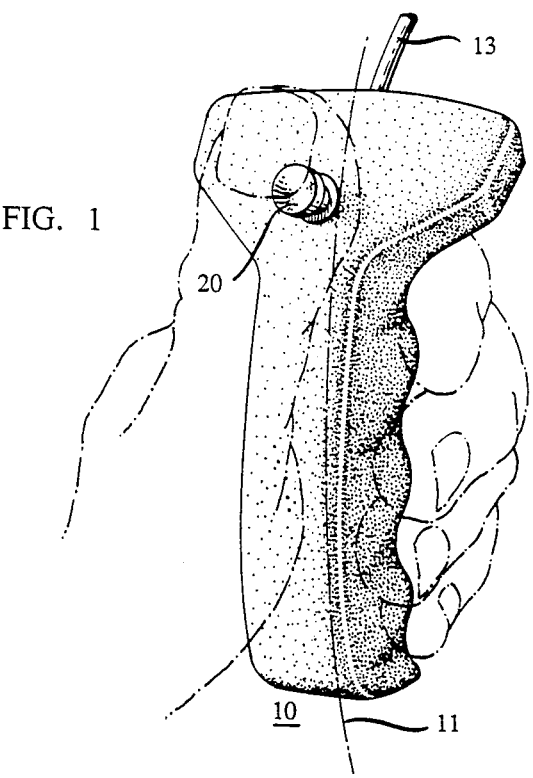
FIG. 1 depicts a controller arrangement in accordance with the principles of this invention.

FIG. 1 illustrates one embodiment of a controller arrangement in accordance with the principles of this invention. Two of the important characteristics of the FIG. 1 arrangement are that the housing unit containing the manipulandum includes an elongated segment that is shaped for convenient grasping with one hand, and that the manipulandum is situated towards one end of the segment and arranged so that all of the available controls embedded in the manipulandum design can be exercised easily with the movement of a single finger (e.g., the thumb) of the grasping hand.

Element 10 of FIG. 1 is the housing unit which contains the manipulandum, and element 20—a joystick—is the manipulandum itself. Element 10 is shown in FIG. 1 in the shape of a handle, which in part is not unlike the shape of a bicycle handle. It is basically cylindrical with a discernible center line 11 which is not necessarily a straight line. The housing can assume different shapes, of course, but it has been determined that for best results, the housing should have a grasping segment and the circumference of the grasping segment's cross section, cut perpendicular to its centerline, should be small enough to permit the thumb and the forefinger to touch each other while grasping the segment. The segment's length along its centerline, most advantageously, should not be less than about half the distance between the base of the index and pinky fingers of an average person who is expected to use the controller. In other words, the segment's length should be long enough for convenient grasping by at least the index and middle fingers.

Unit 10 in FIG. 1 is at least partially hollow, with the enclosed cavity being utilized for the mechanical and electrical equipment associated with the manipulandum. This may include potentiometers, switches, wires, batteries, etc. Cable 13 is shown extending from one end of unit 10, and forming the electrical interface between manipulandum 20 and the external equipment controlled by the manipulandum.

Figure 2:
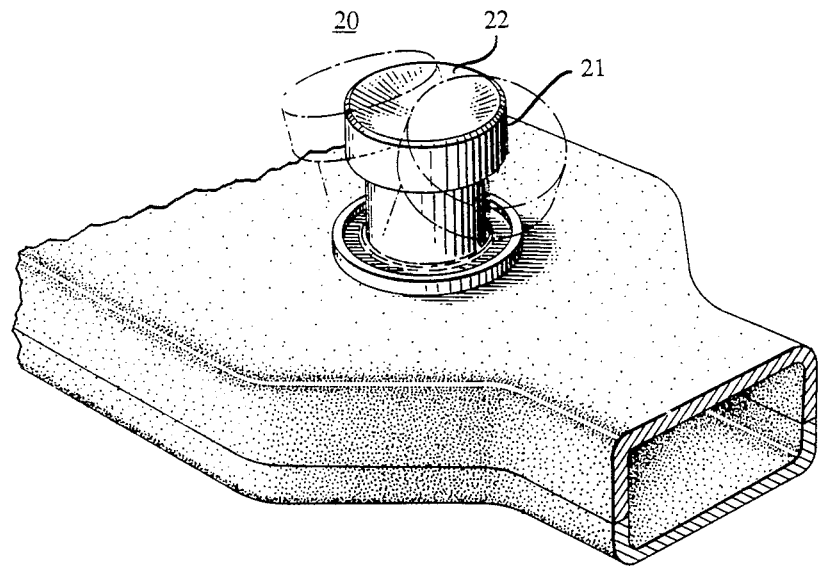
FIGS. 2 and 3 show details of some of the movements possible with the joystick arrangement of FIG. 1.

Manipulandum 20 of FIG. 1 is also shown in FIG. 2. As shown, it is a short joystick with a button-like top 21 adapted for convenient placing of the thumb on top of the joystick. I discovered that, for best results, the joystick should protrude from the surface of unit 10 by no more than 1 inch and its neutral or center position should be essentially perpendicular to center line 11. Button 21 in FIG. 2 also includes a depression 22, which improves the sensitivity and control of the joystick by the thumb. The construction of the switch arrangement actuated by the joystick can follow any of a number of acceptable approaches, such as described by U.S. Pat. No. 4,408,108 issued to J. Smith on Oct. 4, 1983.

Figure 3:
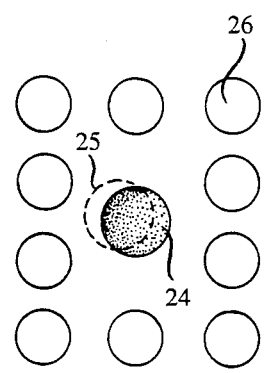

FIG. 3 diagrammatically depicts one contact arrangement for the FIG. 2 controller. Circle 24 represents manipulandum 20 in its neutral position, and circle 25 represents manipulandum 20 as it is moved by the thumb in the east-north-east direction. The small circles (e.g., 26) making up the rectangle surrounding circle 24 identify the different positions that are recognized when manipulandum 20 points to them.

Figure 4:
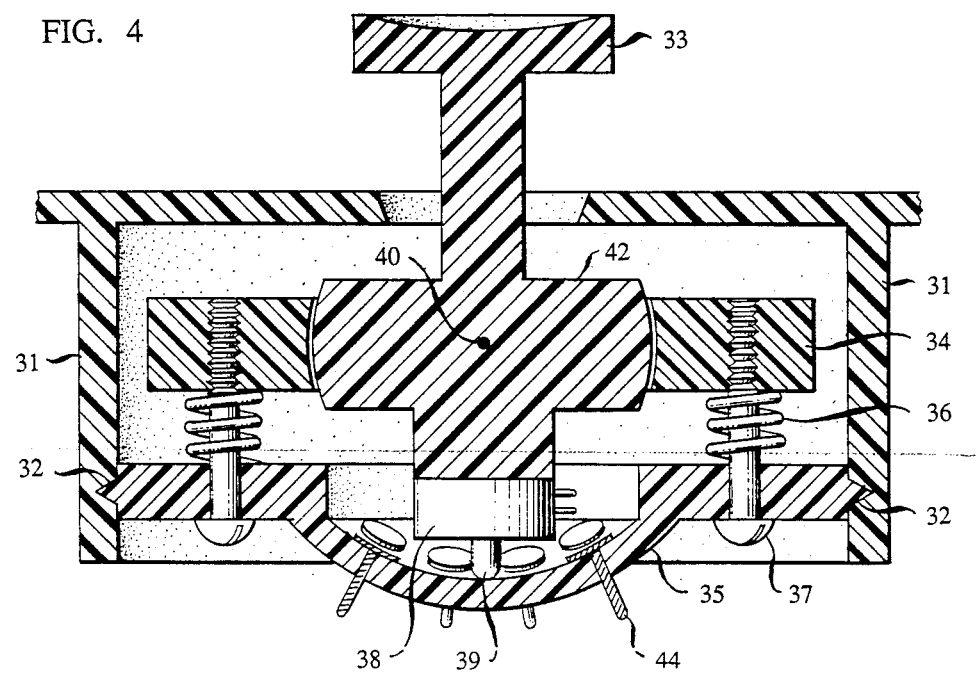
FIG. 4 depicts one embodiment for the manipulandum of FIGS. 1-3.

FIG. 4 depicts a partial cross section of a manipulandum for realizing the switching arrangement of FIG. 3. The manipulandum of FIG. 4 also permits an additional controld dimension by its being movable along its axis, against resilient springs, so as to activate an electrical switch. FIG. 4 shows a cross section of the top surface of housing 10 made of some plastic material and a cross section of a cylindrical stub 31 molded into housing 10 and protruding into the cavity of housing 10. Cylindrical stub 31 contains a number of indentations 32 (two shown) into which the switch assembly can be snapped. The switch assembly is made up of actuator 33, pivoting plate 34, backplate 35, spring 36, screws 37, and micro-switch 38. Actuator 32 contains a shaft portion terminated at one end with a buttonlike cylindrical portion intended for the user's thumb. The other end of the shaft portion has a normally open micro-switch (38) with a depressible contactor element 39. It is useful for actuator element 39 to be metallic and at a known potential (e.g., ground). Thus, when contactor 39 is depressed, it closes a pair of contacts in the micro-swtich and, in addition, imparts its voltage to whatever is pressed on it. Somewhere along the shaft of actuator 33 is a spherical ring-like section 42 which is used for pivoting actuator 33 about an internal center point (40). This spherical section mates with a corresponding spherical ring-like cavity in pivoting plate 34, into which actuator 33 is forced. Once inserted, actuator 33 can pivot about its internal center while plate 34 is held stationary. Plate 34 is connected to backplate 35 through a number of screws that are distributed around the perimeter of plate 34 (e.g., four screws situated to form a square). The screws go through oversized holes in backplate 35 and through springs 36 before being screwed into plate 34. Thus interconnected, in the absence of force on actuator 33 in the direction of center 40, plate 34 is kept away from backplate 35 by a distance dictated by screws 37. Applying such a force on actuator 33 causes plate 34 to come closer to backplate 35, and can cause actuator element 39 to be depressed by backplate 35. Backplate 35 has spherically concave section (centered about point 40) so that actautor element 39 is just touching backplate 35 regardless of how actuator 33 is pivoted. On the inside (concave side) of the concave section there are metallic contacts 44 with electrical pins extending outside of back plate 35 arranged in the pattern of FIG. 3, and those contacts are impressed with the voltage of actuator element 39 when the actuator 33 is pivoted appropriately.

Figure 5:
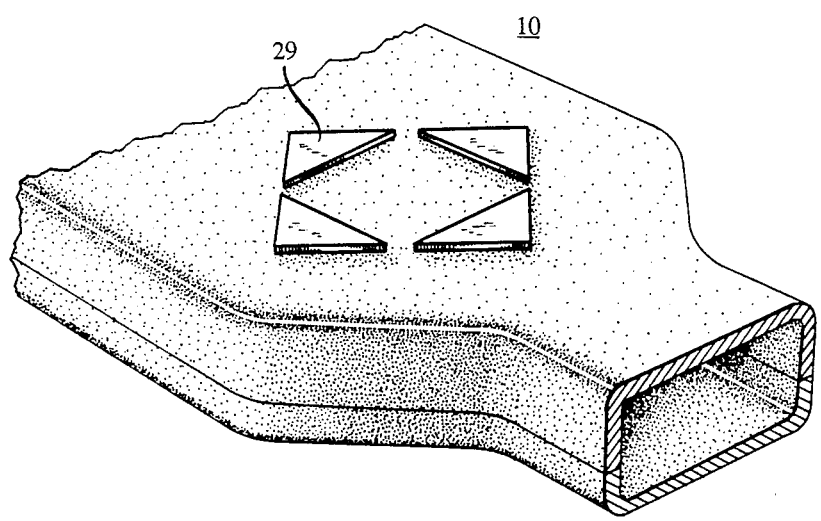
FIG. 5 illustrates an alternative arrangement in accordance with the principles of this invention.

It is within the contemplation of this invention, of course, to employ various types of manipulandi, the joystick being merely an example thereof. FIG. 5 shows an arrangement where the manipulandum (29) comprises a set of independent switches. The important characteristic of manipulandum 29 is that the switches are congregated within a convenient distance from the thumb of the hand grasping unit 10. For best results, such switches should be congregated within an area inscribed by a circle of 2-inch radius.

Figure 6:
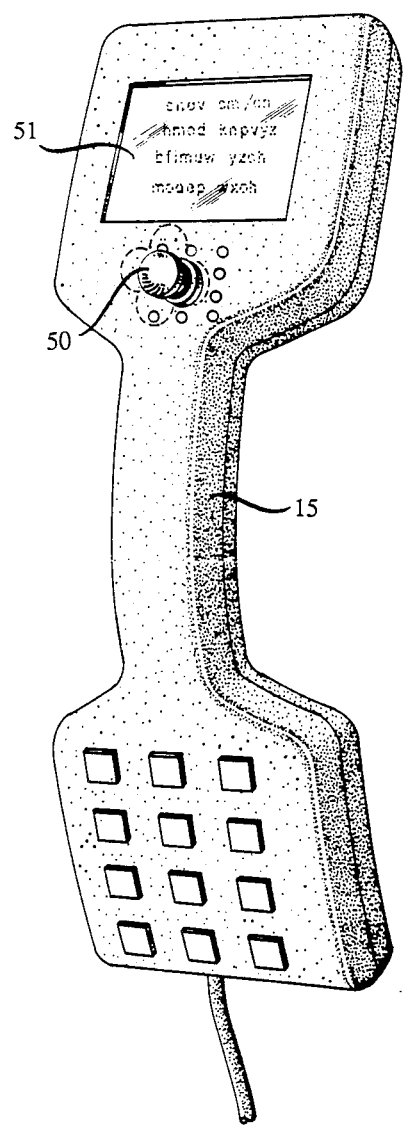
FIG. 6 shows a different housing unit arrangement that combines to effectively cooperate with the manipulandum of FIG. 5.

FIG. 6 depicts a particularly useful control device arrangement. It comprises a housing 15 in the shape of a telephone handpiece, a telephone receiver and transmitter (not shown), push-buttons for conventional touch tone dialing, a manipulandum 50 at the top (behind the receiver), and a liquid crystal communications screen 51 above manipulandum 50. Manipulandum 50 and screen 51 can be coupled to form, for example, a portable computer. Screen 51 displays N lines, and manipulandum 50 presents $2(N+1)$ positions for affecting operation of the portable computer. As shown, for example, in FIG. 3, N positions are offered on the left (4 shown), N positions on the right, one position up (or away) and one position down (or toward). In the arrangement of FIG. 5, manipulandum 50 (like the one in FIG. 4) interacts with electronic circuitry within the handpiece to provide easy control for the user.

What is claimed is:

1. A hand-held device comprising:
    an elongated segment adapted for grasping by hand; and
    a pivotable joystick situated toward one end of said elongated segment and protruding from said elongated segment, having a neutral position that is generally perpendicular to a center line of said elongated segment in the neighborhood of said joystick, said joystick being movable to all of its pivotable positions by the face of the thumb of a hand grasping said elongated segment.

2. The hand-held device of claim 1, further comprising a display element displaying N lines of text, with said joystick possessing at least $2N+1$ electrically identifiable distinct positions.

3. The device of claim 1 wherein said joystick is moveable generally in an axial direction to activate an electrical switch regardless of position to which said joystick is pivoted.

4. A hand-held device comprising:
    an elongated segment adapted for grasping; and
    a multi-position manipulandum protruding from a surface that is generally parallel to a centerline of said elongated segment and within reach of the thumb of a hand grasping said elongated segment and extended generally parallel to the center line of said elongated segment.

5. The device of claim 4 wherein said joystick is movable within a hemisphere and has a countable plurality of positions delineated by regions within said hemisphere.

6. The device of claim 4 wherein said joystick is movable generally along its axis regardless of position to which said joystick is pivoted and further comprising resilient means that, in the absence of applied pressure, maintains said joystick at one of its colinear positions.

7. The device of claim 5, further comprising a display segment that displays N lines of text.

8. The device of claim 7 wherein said joystick has N positions that may be reached by moving said joystick to a first side, and N positions that may be reached by moving said joystick to a second side, where said first and second sides are regions separated by a plane containing said joystick when it is at its center position.

9. The device of claim 8, further comprising a 2N+1th position rached by moving said joystick to one side away from its center position and in said plane, and to a 2N+2th position reached by moving said joystick to another side away from its center position and in said plane.

* * * * *